Jan. 15, 1957 C. W. KINSMAN 2,777,318
STRUCTURAL PLANKING UNIT FOR WALLS OR FLOORS
Filed March 20, 1952 2 Sheets-Sheet 1

CLARENCE WILLIAM KINSMAN
INVENTOR

BY Joseph Blacker
ATTORNEY

Jan. 15, 1957  C. W. KINSMAN  2,777,318
STRUCTURAL PLANKING UNIT FOR WALLS OR FLOORS
Filed March 20, 1952  2 Sheets-Sheet 2
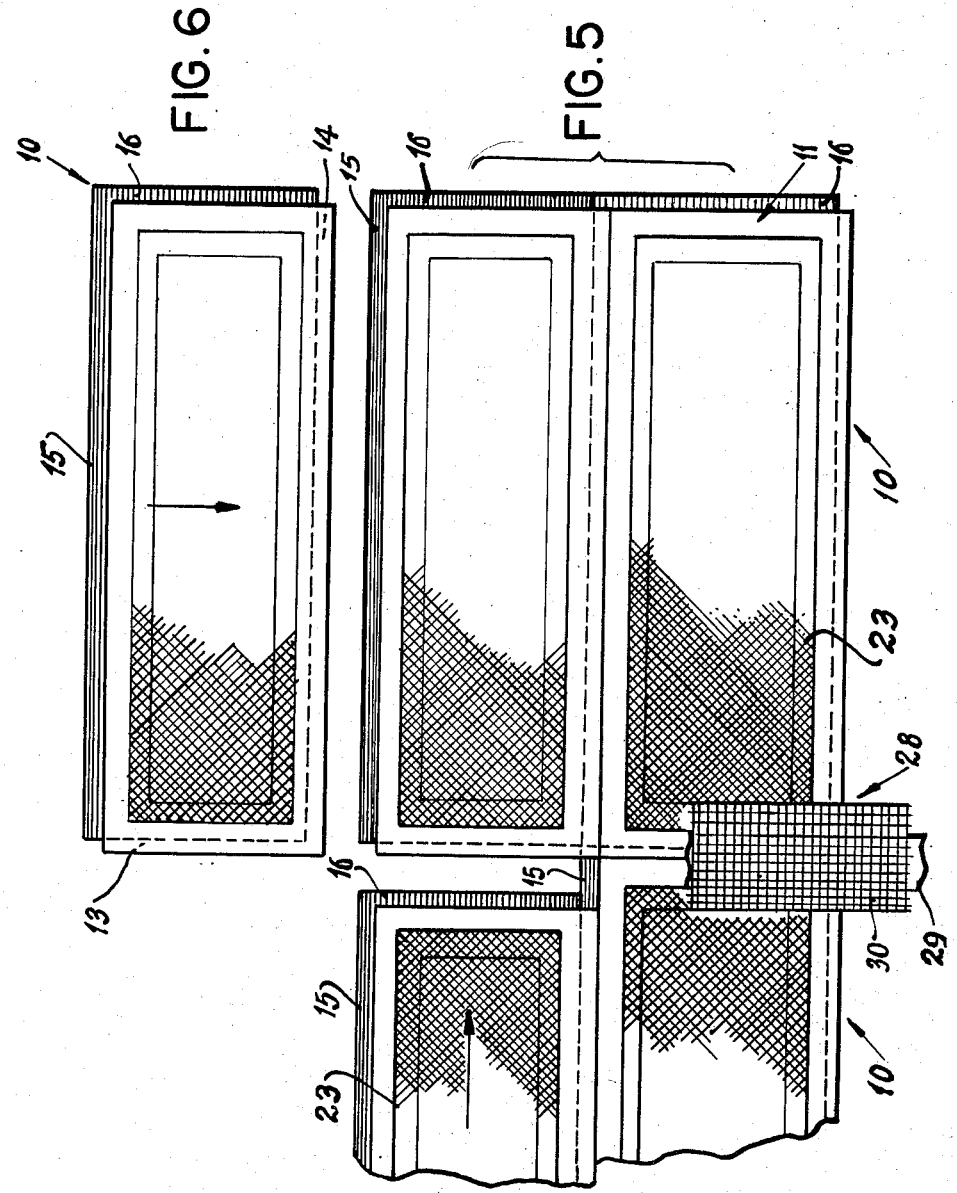
CLARENCE WILLIAM KINSMAN
INVENTOR
BY Joseph Blacker
ATTORNEY

United States Patent Office 2,777,318
Patented Jan. 15, 1957

2,777,318

STRUCTURAL PLANKING UNIT FOR WALLS OR FLOORS

Clarence William Kinsman, New York, N. Y.

Application March 20, 1952, Serial No. 277,618

4 Claims. (Cl. 72—32)

This invention relates to an improved pre-fabricated building construction, wherein use is made of improved standardized planking units capable of being conveniently handled and readily assembled and disassembled.

An object of this invention is the provision of a structural planking unit having requisite strength, desirable fire-resisting quality, great flexibility in its application and which may be cheaply and efficiently produced.

Another object of this invention is to provide a composite structural planking unit which may be manufactured prior to erection or assembly, will be completely finished in a shop or factory and be shipped to the building site in a finished state for assembly and erection only.

Another object of this invention is to provide a structural planking unit for walls or floors, comprising a hollow enclosing metal frame body of structural channel members and a core comprising a plurality of integrally bonded layers of fibrous insulation materials, the channel members being substantially U-shaped in cross-section and having flanges, the flanges forming the outer edges of the planking units, the abutting edges of each of the planking units having interengaging means for alining the units in wall making relation when placed in assembled position.

In prior designs of planking units it was impracticable to position structural planking units vertically as wall members for load carrying purposes. With the composite structural planking unit herewith disclosed, it is possible to use them at any load carrying portion of a structure and carry the required loads.

The composite structural planking unit herewith disclosed has an outwardly projecting wire mesh face to which hard finished outer surface layers may be secured either integrally bonded at the factory or after the planking units are assembled in wall or floor making relation.

The sectional core of the composite structural planking unit herewith disclosed has faces made of material through which nails may be driven for securing the usual finishing elements such as asbestos shingles, aluminum or wood clapboards, etc., to the planking unit.

This application is an improvement on my patent application for Portable House, Serial No. 186,878, filed September 26, 1950, now Patent No. 2,687,896, and on my U. S. Patent No. 2,527,012.

With the above and other objects in view, the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views, in which:

Figure 5 is a front elevation of a plurality of planking units in assembled wall making relation and showing a fragmentary portion of the composite tape and wire mesh strip applied to a vertical junction of the wall.

Figure 6 is a front elevation of a planking unit in the process of being lowered into inter-engagement with a lower planking unit in the wall.

Figure 1:
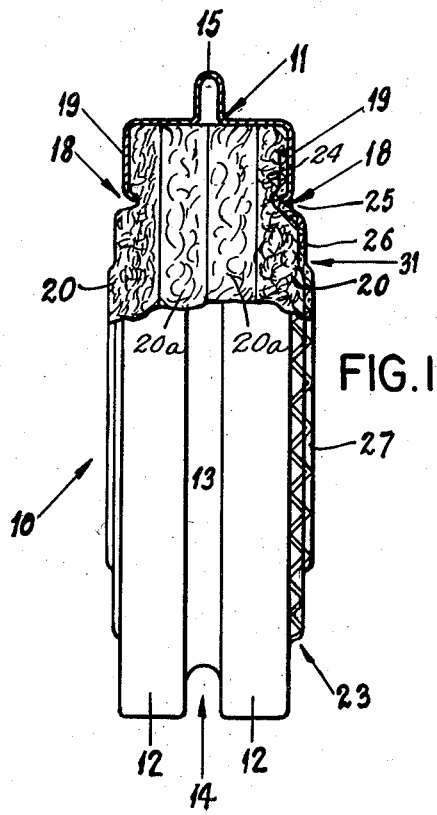
Figure 1 is an end elevation of a structural planking unit embodying the invention, the unit being partly broken away to show the interior thereof.

In the illustrated embodiment of the invention, the numeral 10 indicates a structural planking unit embodying the invention and comprises a hollow metallic frame body 11 shaped to form channel members 12, 12 which are in spaced-apart relation to provide a vertical groove 13 at one end and a horizontal groove 14 at the lower side of the planking unit. Since the body is hollow it has an inner portion. The planking unit also comprises a horizontal tongue 15 at its upper side and a vertical tongue 16 at its other end. The grooves are in right-angular relation with each other and serve to respectively receive a vertical tongue and a horizontal tongue from an adjoining planking unit, as best shown in Figure 5.

Figure 2:
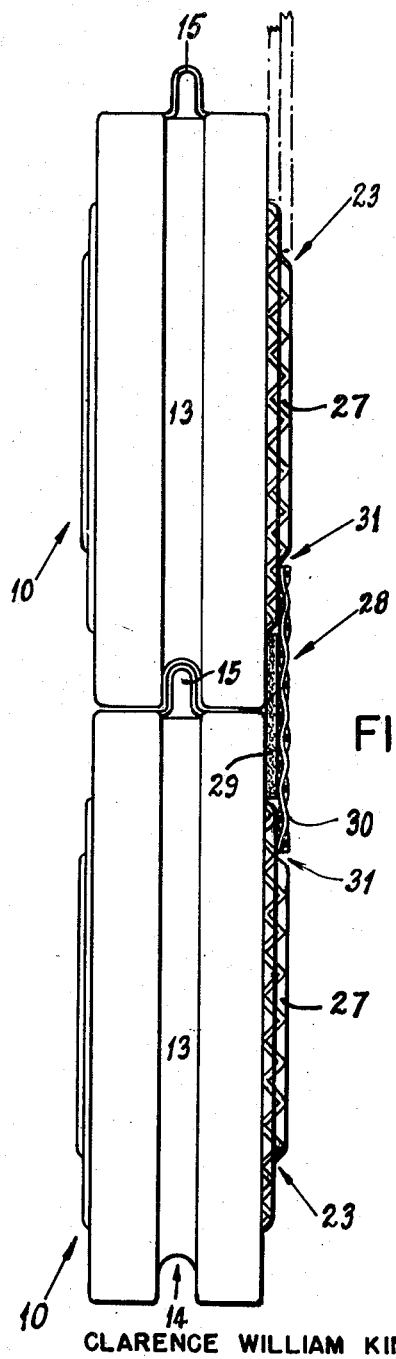
Figure 2 is an end elevation of two assembled planking units and showing a composite adhesive tape and wire mesh strip, covering the junction of the planking units, on one side.
Figure 3:
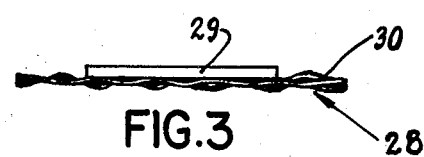
Figure 3 is an end view of the composite tape and mesh strip.
Figure 4:
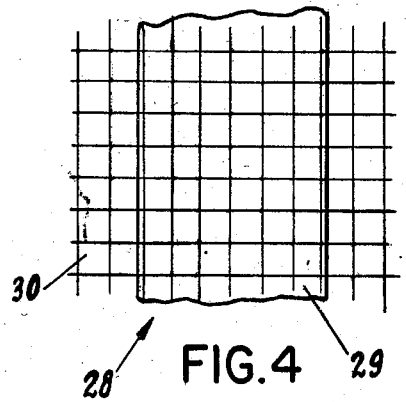
Figure 4 is a plan view of a fragmentary portion of the composite tape and mesh strip.

As shown in Figures 2 and 5, the structural planking units 10 may be assembled to form load carrying wall or floor structures.

The hollow metallic frame body 11 has, prior to assembly, a large rectangular aperture 18 in each side or flange 19 through which two fibrous insulation outer core layers 20, 20 are visible and makes it possible to drive nails into the core layers for attaching finishing materials to the assembled planking units. As best shown in Figures 1 and 2, the outer layers 20 of the fibrous insulation core layers extend laterally outwardly beyond the outer face of the metal frame body 11.

As shown in Figures 1 and 2, I have provided a two-step wire cloth or wire mesh 23, having its outer edges 24 placed inwardly of the metallic frame body 11. A weld 25 unites the wire mesh boundary 24 to the outer edges defining the aperture 18. As shown in Figures 1, 2 and 5, the wires of the mesh 23 are diagonally positioned.

The wire mesh 23 has a portion 26 which extends in one step outside the metal frame body 11, and in contact with an outer core layer 20. It is to be noted that a central portion 27 of the stepped portion 26 is further stepped outwardly for a purpose to be described. The stepped portion 27 is also in contact with the outer layer 20.

For the purpose of providing a more perfect junction between the planking units 10, I employ a moisture resistant and heat insulating strip of composite tape 28 comprising a felt-like strip 29 forming an adhesive joint covering. The felt-like strip 29 is faced with a strip wire cloth 30 which is wider than the felt-like strip 29 so as to lap over the recessed edge portions 31 of the outer core layers 20 to prevent cracks appearing in the interior and exterior finished covering layers of the wall, such as plaster and stucco.

The joint covering composite tape 28 acts as a bond for the plastic cement applied over the wire of the tape, which is necessary in order to provide finished surfaces substantially flush with the outer faces of the planking unit panels.

As shown in Figure 1, the core insert comprises two fibrous outer layers 20, 20 and two inner layers 20a, 20a. The outer layers are sectioned to show harder material than the inner layers.

It is to be noted that the stepped portion 26 is to provide for the thickness of felt-like strip 29, while the stepped portion 27 provides for the thickness of the wider wire cloth strip 30 and the plastic cement. This arrangement provides smooth finish surfaces on one or both of the outer faces of the wall.

It is to be noted that the planking units 10 can be most conveniently made in large sizes, two to four feet wide by eight to twelve feet high and assembled very rapidly at the site in floor, wall and roof making relation.

The adjacent planking units are secured to each other by tack welding the metallic frame bodies at their junctions. Some of the planking units of the above sizes can be made to include doors, windows or other openings.

In accordance with the patent statutes, I have described and illustrated the preferred embodiment of my invention, but it will be understood that various changes and modifications can be made therein without departing from the spirit of the invention as defined by the appended claims.

I claim:

1. A composite load carrying structural planking unit, comprising a hollow and enclosing rectangular structural metal body having a tongue on one edge and a groove on the opposite edge at the lengthwise extent and at the widthwise extent of said body, the metal body having a pair of opposite side faces, said metal body prior to assembly having rectangular apertures in both side faces thereof, and an inner cavity extending between the apertures, a layer of wire mesh having diagonally positioned wires welded together and placed inside said body, said mesh being bent outwardly of said metal body at one of said apertures and united in permanent union to the edges defining said aperture at one of said side faces so as to form a mesh layer extending sideways beyond said one side face of said body and in covering relation with said one aperture, the plane of the wire mesh being slightly outside the plane of said one side face of said body, a sectional core of fibrous insulation material filling the inner cavity of said body, said sectional core having a hard finished outer layer and at least one inner layer, the outer layer being made of material harder than said inner layer and secured to said inner layer, said outer layer extending through said aperture to provide an outer face, the plane of which is appreciably outside said one side face of said body, said diagonally positioned wire permitting a load to be carried by said wire mesh to augment the load carrying capacity of said metal body in horizontal, vertical and diagonal directions.

2. A composite load carrying structural planking unit, comprising a hollow rectangular structural metal enclosing body having a tongue on one edge and a groove on the opposite edge at the lengthwise extent and at the widthwise extent of said body, said metal enclosing body having a pair of opposite side faces prior to assembly and having a rectangular aperture in each side face thereof communicating with an inner cavity in the body, a layer of wire mesh having diagonally positioned wires welded together and having the edges of the wire mesh placed inside said enclosing body, said mesh being bent outwardly of said metal enclosing body at one of said apertures and united in permanent union to the edges defining said aperture at one of said side faces so as to form a mesh layer extending sideways beyond one side face of the said body and in covering relation with said one aperture, the plane of the wire mesh being slightly outside the plane of said one side face of said body, a sectional core of insulation material layers filling the inner cavity of said body, said core comprising two outer layers and at least one inner layer, the outer layers being made of material harder than said inner layer and bonded to said inner layer, each outer layer extending through one of said apertures to provide an outer face on the respective side face of the body, the plane of each outer face being appreciably outside the plane of the respective side face of the body, said diagonally positioned wire of said wire mesh permitting a load to be carried by said wire mesh to augment the load carrying capacity of said metal enclosing body in horizontal, vertical and diagonal directions.

3. In a composite structural planking unit, comprising in combination a hollow enclosing metal frame body having at least one side face, a core inside said metal frame body including a plurality of layers of fibrous insulation material, the core having a pair of opposite side faces, and a layer of wire mesh having diagonally positioned wires welded together at their junctions and secured to one side face of said metal frame body, the peripheral portion of said body being substantially U-shaped in cross-section, said wire mesh extending sideways beyond the plane of said one side face of said body and in contact solely with one side face of said core and forming an outer face of said planking unit, the outside surface portions of the body being entirely exposed and having tongues and grooves along the peripheral edges thereof for aligning adjacent planking units in interengaging relation.

4. In a composite structural planking unit, comprising in combination a hollow enclosing metal frame body having at least one side face, a core inside said metal frame body having a pair of opposite side faces with one face thereof extending sideways beyond said one side face of the metal body and including a plurality of layers of fibrous insulation materials, and a layer of wire mesh having diagonally positioned wires welded together at their junctions and secured to said one side face of said metal frame body, the peripheral portion of said body being substantially U-shaped in cross-section, said wire mesh extending sideways beyond the plane of said one side face of said body in contact solely with said one side face of said core and forming an outer face of said planking unit, the outer surface portions of the metal body being entirely exposed and having tongues and grooves along the perihperal edges thereof for aligning adjacent planking units in interengaging relation, the wire mesh of said planking unit having a two-step outward formation and providing said planking unit with a recess permitting a two-step composite joint tape to be placed over the joints of adjacent planking units to prevent cracks appearing in the interior and exterior finish covering layers.

References Cited in the file of this patent

UNITED STATES PATENTS

| | | |
|---|---|---|
| 1,335,909 | Munroe | Apr. 6, 1920 |
| 1,369,500 | Toles | Feb. 22, 1921 |
| 1,448,886 | Walper | Mar. 20, 1923 |
| 1,534,088 | Shaw | Apr. 21, 1925 |
| 1,734,771 | Mitchell | Nov. 5, 1929 |
| 1,808,976 | Wunderlich | June 9, 1931 |
| 1,885,330 | Cherdron et al. | Nov. 11, 1932 |
| 1,892,498 | Adams | Dec. 27, 1932 |
| 2,009,056 | Schaffert | July 23, 1935 |
| 2,059,664 | Tashjian | Nov. 3, 1936 |
| 2,061,633 | Muller | Nov. 24, 1936 |
| 2,062,724 | Olsen | Dec. 1, 1936 |
| 2,142,305 | Davis | Jan. 3, 1939 |
| 2,184,113 | Calafati | Dec. 19, 1939 |
| 2,314,523 | Speer | Mar. 23, 1943 |
| 2,338,246 | Hoge | Jan. 4, 1944 |